(12) United States Patent
Vassieux et al.

(10) Patent No.: US 11,890,941 B2
(45) Date of Patent: Feb. 6, 2024

(54) HYBRID SUB-ASSEMBLY FOR DRIVING A VEHICLE, HYBRID ENGINE UNIT AND HYBRID DRIVE METHOD

(71) Applicant: VALEO EMBRAYAGES, Amiens (FR)

(72) Inventors: Loic Vassieux, Amiens (FR); Dominique Lheureux, Amiens (FR)

(73) Assignee: VALEO EMBRAYAGES, Amiens (FR)

( * ) Notice: Subject to any disclaimer, the term of this patent is extended or adjusted under 35 U.S.C. 154(b) by 0 days.

(21) Appl. No.: 17/664,927

(22) Filed: May 25, 2022

(65) Prior Publication Data

US 2022/0379715 A1   Dec. 1, 2022

(30) Foreign Application Priority Data

May 27, 2021   (FR) ...................................... 21 05505

(51) Int. Cl.
*B60K 6/48* (2007.10)
*B60K 6/547* (2007.10)
*B60K 6/54* (2007.10)

(52) U.S. Cl.
CPC ................ *B60K 6/547* (2013.01); *B60K 6/48* (2013.01); *B60K 2006/4816* (2013.01); *B60K 2006/541* (2013.01)

(58) Field of Classification Search
CPC .. B60K 6/547; B60K 6/48; B60K 2006/4816; B60K 2006/541
USPC .......................................................... 74/661
See application file for complete search history.

(56) References Cited

U.S. PATENT DOCUMENTS

| | | | | |
|---|---|---|---|---|
| 9,476,461 B2* | 10/2016 | Genise | ...................... | B60K 6/48 |
| 9,783,065 B2* | 10/2017 | Pritchard | .................. | B60K 6/12 |
| 10,274,050 B2* | 4/2019 | Lee | .......................... | F16H 3/006 |
| 10,899,219 B2* | 1/2021 | Lian | .......................... | B60K 6/48 |
| 2011/0290072 A1* | 12/2011 | Xie | .......................... | B60K 6/547 |
| | | | | 903/909 |

(Continued)

FOREIGN PATENT DOCUMENTS

| | | |
|---|---|---|
| EP | 3 100 891 A1 | 12/2016 |
| WO | WO 2011/154823 A1 | 12/2011 |
| WO | WO 2016/046001 A1 | 3/2016 |

OTHER PUBLICATIONS

French Preliminary Search Report dated Dec. 16, 2021 in French Application 21 05505 filed on May 27, 2021, 10 pages (with English Translation of Categories of Cited Documents & Written Opinion).

*Primary Examiner* — Ha Dinh Ho

(74) *Attorney, Agent, or Firm* — Oblon, McClelland, Maier & Neustadt, L.L.P.

(57) ABSTRACT

A hybrid sub-assembly for driving a vehicle includes at least one primary shaft, at least one secondary shaft, a transmission gearbox including at least one intermediate shaft different from the primary shaft and the secondary shaft, and an electromotive unit. The electromotive unit includes at least one reversible electric machine, and a coupling device that can take up at least one intermediate coupling position in which an output shaft of the reversible electric machine is kinematically connected to the intermediate shaft, and a secondary coupling position in which an output shaft of the reversible electric machine is kinematically connected to the secondary shaft without going via the intermediate shaft.

19 Claims, 3 Drawing Sheets

(56) References Cited

U.S. PATENT DOCUMENTS

| | | |
|---|---|---|
| 2011/0303048 A1 | 12/2011 | Genise |
| 2014/0157923 A1* | 6/2014 | Lee .......................... F16H 3/08 |
| | | 74/330 |
| 2014/0171259 A1 | 6/2014 | Genise |
| 2016/0207392 A1* | 7/2016 | Zhang ..................... B60K 6/36 |
| 2016/0355082 A1 | 12/2016 | Cimatti |
| 2021/0070280 A1 | 3/2021 | Genise et al. |

* cited by examiner

HYBRID SUB-ASSEMBLY FOR DRIVING A VEHICLE, HYBRID ENGINE UNIT AND HYBRID DRIVE METHOD

TECHNICAL FIELD OF THE INVENTION

The invention relates to a drive sub-assembly intended to be positioned between an engine, for example an internal combustion engine, and a set of one of more drive wheels of a vehicle. It relates in particular, although not exclusively, to such a sub-assembly intended to equip a heavy-duty vehicle, that is to say a road vehicle weighing more than 3.5 tonnes, in particular a tractor unit, or a truck.

PRIOR ART

AT520019B1 describes a vehicle powertrain, including a primary shaft suitable for being driven by an engine of the vehicle, a secondary shaft suitable for driving an assembly of one or more drive wheels of the vehicle, and a transmission gearbox including one or more primary gear wheels secured to the primary shaft for rotation therewith or capable of being coupled to the primary shaft, a plurality of secondary gear wheels secured to the secondary shaft for rotation therewith or capable of being coupled to the secondary shaft, and an intermediate shaft to which intermediate gear wheels are secured for rotation therewith, the primary gear wheel(s) and the secondary gear wheel(s) each meshing with a corresponding gear wheel of the intermediate gear wheels. The vehicle powertrain also has a reversible electric machine kinematically connected to the intermediate shaft and able to operate as a current generator in order to brake the intermediate shaft or as a drive motor for the intermediate shaft. Such an electric machine makes it possible to envisage different operating modes, and in particular transient operation of the electric machine in order to brake or accelerate the intermediate shaft and promote the synchronization of the transmission gearbox in the phases of a gear change, operation as a motor in order to assist the driving of the main engine of the vehicle outside the phases of a gear change, and operation as an electric generator in order to supply power to accessories of the vehicle or to a battery, in particular in braking phases of the vehicle.

GB1435517A describes a transmission gearbox comprising an output shaft and a countershaft, and a gearset between the countershaft and the output shaft, comprising a first gear wheel secured to one of the two shafts and a second gear wheel that can be secured to the other shaft via a dog clutch. A reversible electric machine is permanently coupled to the countershaft and the coupling means are driven so as to synchronize the speed of the second gear wheel and the dog clutch before they engage.

In these devices, the intermediate shaft or the countershaft is always connected to the shaft of the electric machine, which limits the operating modes that can be envisaged.

SUMMARY OF THE INVENTION

The invention aims to overcome the drawbacks of the prior art and to provide better integration of an electric machine with a transmission gearbox intermediate shaft, making it possible to envisage previously unobtainable operating modes.

To this end, according to a first aspect, the invention provides a hybrid sub-assembly for driving a vehicle, of the type comprising: at least one primary shaft, at least one secondary shaft and a transmission gearbox comprising at least one intermediate shaft different from the primary shaft and the secondary shaft and sets of gear wheels for obtaining a plurality of gear ratios between the primary shaft and the secondary shaft via the intermediate shaft. The hybrid sub-assembly further comprises an electromotive unit comprising at least one reversible electric machine, and a coupling device which, in at least one intermediate coupling position, kinematically connects an output shaft of the reversible electric machine to the intermediate shaft. Notably, the coupling device, in at least one secondary coupling position, kinematically connects the output shaft of the reversible electric machine to the secondary shaft without going via the intermediate shaft.

In the secondary coupling position, the coupling device allows direct power transmission between the reversible electric machine and the secondary shaft without driving of the intermediate shaft. This makes it possible to envisage various operating modes which will be described below, such as: a mode in which the secondary shaft is permanently electrically driven by the reversible electric machine operating as a motor, a transient mode in which traction is maintained during gear changes, or a pure regenerative braking mode minimizing mechanical resistive torque. These operating modes are additional to those obtainable in the intermediate coupling position.

The coupling device may comprise a plurality of coupling and/or uncoupling positions, for example three different coupling positions, allowing transmission of power from the reversible electric machine to the intermediate shaft or the secondary shaft according to different gear ratios.

The reversible electric machine could in particular be a permanent-magnet synchronous machine, an asynchronous machine, a variable reluctance electric machine or a variable reluctance synchronous electric machine, referred to as synchronous-reluctance.

According to one embodiment, the coupling device, in at least one uncoupling position, kinematically uncouples the output shaft of the reversible electric machine simultaneously from the intermediate shaft and the secondary shaft. This position of the coupling device makes it possible to implement additional operating modes in which the electric machine is uncoupled, either because it is not necessary for operation of the transmission gearbox or because it is being used for other purposes, for example to drive another rotary member. Uncoupling the electric machine makes it possible to limit inertia and resistive torque in the intermediate shaft, and to relieve the guide bearings in its rotor, increasing the lifetime of these bearings.

According to one embodiment, the coupling device comprises at least one coupling mechanism permanently kinematically connected to the output shaft of the reversible electric machine, an intermediate speed reducer permanently kinematically connected to the intermediate shaft and a secondary speed reducer permanently kinematically connected to the secondary shaft. The secondary speed reducer may advantageously comprise a reversing gear wheel rotationally guided by a guide bearing that is coaxial with the intermediate shaft.

The reversible electric machine should preferably be dimensioned such that it is fully operational over broad operating ranges in the various modes of operation envisaged. Thus, preferably, the reversible electric machine meets one or more of the following criteria:

the reversible electric machine is capable of continuously providing a driving torque of greater than 300 Nm, preferably greater than 350 Nm, over a range of speeds spanning more than 1000 rpm, preferably more than 2000 rpm, between a lower limit below 6000 rpm, preferably below 5000 rpm, and an upper limit above 6000 rpm, preferably above 7000 rpm, preferably above 9000 rpm;

the reversible electric machine is capable of providing a resistive torque of greater than 400 Nm, preferably greater than 450 Nm, over a range of speeds spanning more than 3000 rpm, preferably more than 4000 rpm, between a lower limit below 6500 rpm, preferably below 6000 rpm, and an upper limit above 9000 rpm, preferably above 10000 rpm, for 30 seconds;

the reversible electric machine is capable of providing a driving torque of greater than 50 Nm, preferably greater than 60 Nm, over a range of speeds spanning more than 5500 rpm, preferably more than 7000 rpm, between a lower limit below 5000 rpm, preferably below 4500 rpm, and an upper limit above 10000 rpm, preferably above 11000 rpm, for 5 seconds in a transient gear change phase.

In practice, in the intermediate coupling position, the coupling device kinematically connects the output shaft of the reversible electric machine to the intermediate shaft with a gear ratio referred to as intermediate, while in the secondary coupling position, the coupling device kinematically connects the reversible electric machine to the secondary shaft with a gear ratio referred to as secondary. According to one embodiment, the coupling device meets one or more of the following criteria:

the secondary gear ratio is greater than 6, preferably greater than or equal to 8;

the intermediate gear ratio is greater than 4, preferably greater than or equal to 6, between the intermediate shaft and the output shaft of the reversible electric machine;

the secondary gear ratio is strictly greater than the intermediate gear ratio, preferably with a factor greater than or equal to 1.5 between the secondary gear ratio and the intermediate gear ratio.

It may be advantageous to have several gear ratios between the reversible electric machine and the intermediate shaft and/or between the reversible electric machine and the secondary shaft. To this end, one or more of the following arrangements may be adopted:

in an additional intermediate coupling position, the coupling device kinematically connects the reversible electric machine to the intermediate shaft with an additional intermediate gear ratio that is different from the intermediate gear ratio;

in an additional secondary coupling position, the coupling device kinematically connects the reversible electric machine to the secondary shaft with an additional secondary gear ratio that is different from the secondary gear ratio.

According to one particularly advantageous embodiment, the hybrid sub-assembly further comprises a power take-off member that can be driven by at least the reversible electric machine, preferably in one of the following manners:

the power take-off member is permanently kinematically connected to the intermediate shaft;

the power take-off member is kinematically connected to the intermediate shaft by the coupling device in the intermediate coupling position;

the power take-off member is kinematically connected to the output shaft of the reversible electric machine by the coupling device in the intermediate coupling position.

According to this embodiment, the power take-off member may be coaxial with the intermediate shaft.

According to another particularly advantageous embodiment, the hybrid sub-assembly comprises a power take-off member that can be driven by at least the reversible electric machine, the power take-off member being permanently kinematically connected to the output shaft of the reversible electric machine.

It is thus possible to envisage driving the power take-off by the reversible electric machine without using the main engine of the vehicle, which makes it possible to achieve rotation speeds very much higher than 1000 rpm, for example higher than 1500 rpm, and if applicable up to 5000 rpm.

In practice, the transmission gearbox may advantageously comprise:

one or preferably a plurality of primary gear wheels that can be coupled to the primary shaft, for example by one or more coupling and uncoupling mechanisms, for example synchronizers and/or dog clutches, a plurality of secondary gear wheels that can be coupled to the secondary shaft, for example by one or more coupling and uncoupling mechanisms, for example synchronizers and/or dog clutches, intermediate gear wheels permanently secured to the intermediate shaft, the primary gear wheel(s) and the secondary gear wheels each meshing permanently with a corresponding gear wheel of the intermediate gear wheels to create the sets of gear wheels.

In practice, the transmission gearbox comprises coupling mechanisms for coupling alternately each of the primary gear wheels to the primary shaft and each of the second gear wheels to the secondary shaft. Where applicable, the hybrid sub-assembly may further comprise a wet or dry friction clutch intended to be arranged between the primary shaft and the main engine.

Various configurations of the primary gear wheels, the secondary gear wheels, the intermediate shaft and the rotor of the reversible electric machine may be envisaged.

According to one embodiment, the axes of revolution of the primary shaft and the secondary shaft are coincident. Alternatively, these axes are parallel and separate.

According to one exemplary embodiment, the output shaft of the reversible electric machine has an axis of revolution parallel to an axis of revolution of the intermediate shaft, one or more of the following features preferably being present:

the axis of revolution of the output shaft is coincident with the axis of revolution of the intermediate shaft;

the axis of revolution of the output shaft is separate from the axis of revolution of the intermediate shaft;

the axis of revolution of the output shaft is separate from an axis of revolution of the primary shaft;

the axis of revolution of the output shaft is separate from an axis of revolution of the secondary shaft.

According to one embodiment, the coupling device comprises a planetary gearset arranged kinematically between the output shaft and the secondary shaft.

According to various alternatives, the coupling device comprises one or more of the following coupling mechanisms:

a dog mechanism, a synchronizer mechanism, a clutch mechanism, preferably a friction clutch mechanism, preferably a wet friction clutch mechanism, a double friction clutch, preferably a wet double friction clutch, a triple friction clutch, preferably a wet triple friction clutch.

In particular, it is possible to envisage a dog mechanism without synchronization, in cases where the electric machine is itself to be used to synchronize the coupling device with the associated gear wheel.

According to one embodiment, the hybrid sub-assembly is equipped with a control unit for controlling the reversible electric machine and the coupling device, and sensors capable of generating a signal representative of a speed of revolution of the intermediate shaft or of a member kinematically connected thereto, and a signal representative of a speed of revolution of the reversible electric machine or of a member kinematically connected thereto. The control unit may in particular be used to synchronize the coupling device. Preferably, when the coupling device is in an uncoupled state, the control unit can control the reversible electric machine such that a relative speed of rotation between the coupling member kinematically connected to the reversible electric machine and the coupling member kinematically connected to the intermediate shaft meets a predetermined condition, and when the predetermined condition is met, can order the coupling device to be coupled. The predetermined condition may for example be a zero relative speed of rotation or a predetermined relative slip speed.

According to another aspect of the invention, it comprises a hybrid engine unit with a main engine, preferably an internal combustion engine, and a hybrid sub-assembly as described above. The main engine has a main drive shaft connected to the primary shaft directly or via a clutch or a torque converter.

Preferably, the control unit for controlling the coupling device is operational to manage one or more of the following operating modes:
  a transient mode in which traction is maintained during a gear shift, in which the coupling device is placed in the secondary coupling position, the main engine is uncoupled from the intermediate shaft, and the reversible electric machine is ordered to generate a driving torque on the secondary shaft or to minimize a variation in speed of the secondary shaft when a change in gear ratio of the transmission gearbox is ordered;
  a mode of pure regenerative deceleration without the intermediate shaft, in which the coupling device is placed in the secondary coupling position, the secondary shaft is uncoupled from the intermediate shaft and electrical energy is generated with the reversible electric machine operating as a generator;
  a mode of direct electric drive without the intermediate shaft, in which the coupling device is placed in the secondary coupling position, the intermediate shaft is uncoupled from the secondary shaft and the reversible electric machine is acting in drive mode.

Preferably, the control unit is operational to manage one or more of the following operating modes:
  a reinforcement mode, in which the transmission gearbox produces one of the gear ratios between the primary shaft and the secondary shaft, via the intermediate shaft, the main engine is supplied with power so as to drive the primary shaft and exert a main driving torque on the intermediate shaft, the coupling device is placed in the intermediate coupling position, and the reversible electric machine generates a reinforcement driving torque on the intermediate shaft, with the same sign as the main driving torque;
  a charging mode, in which the transmission gearbox is positioned so as to connect the primary shaft to the intermediate shaft, the main engine is supplied with power so as to drive the primary shaft and exert a main driving torque on the intermediate shaft, the coupling device is placed in the intermediate coupling position, and kinetic energy is converted to electrical energy with the reversible electric machine operating as a generator;
  a transient mode of synchronization of the intermediate shaft during a shift in one of the gear ratios of the transmission gearbox, in which the coupling device is placed in the intermediate coupling position, the main engine is uncoupled from the intermediate shaft, then the reversible electric machine is ordered to bring the intermediate shaft to a speed setpoint allowing engagement of the secondary gear wheel before recoupling the main engine to the intermediate shaft;
  an indirect electric drive mode, in which the coupling device is placed in the intermediate coupling position and the main engine is uncoupled from the intermediate shaft, while the intermediate shaft is kinematically connected to the secondary shaft, then the reversible electric machine is controlled according to a speed setpoint of the vehicle;
  a mode of regenerative braking via the intermediate shaft, in which the coupling device is placed in the intermediate coupling position, the main drive shaft is uncoupled from the intermediate shaft and the reversible electric machine is ordered to operate as a generator;
  a hybrid drive braking mode, in which the coupling device is placed in the intermediate coupling position, one of the gear ratios between the primary shaft and the secondary shaft via the intermediate shaft being engaged, the primary shaft being kinematically connected to the main drive shaft, and kinetic energy is converted to electrical energy with the reversible electric machine operating as a generator and kinetic energy is converted to heat with the main engine providing a resistive torque;
  a power take-off drive mode, in which the coupling device is placed in the intermediate coupling position and the main engine is uncoupled from the intermediate shaft, the intermediate shaft from the secondary shaft, then the reversible electric machine is ordered to drive a power take-off coupled to the intermediate shaft.

According to another aspect of the invention, it relates to a hybrid drive method for a vehicle comprising a hybrid engine unit as described above. With a control unit for controlling the coupling device, one or more of the following operating modes are managed:
  a transient mode in which traction is maintained during a gear shift, in which the coupling device is placed in the secondary coupling position, the main engine is uncoupled from the intermediate shaft, and the reversible electric machine is ordered to generate a driving torque on the secondary shaft or to minimize a variation in speed of the secondary shaft when a change in gear ratio of the transmission gearbox is ordered;
  a mode of pure regenerative deceleration without the intermediate shaft, in which the coupling device is placed in the secondary coupling position, the secondary shaft is uncoupled from the intermediate shaft and electrical energy is generated with the reversible electric machine operating as a generator;
  a mode of direct electric drive without the intermediate shaft, in which the coupling device is placed in the secondary coupling position, the intermediate shaft is uncoupled from the secondary shaft and the reversible electric machine provides the drive.

Preferably, one or more of the following operating modes are managed with the control unit:
- a reinforcement mode, in which the transmission gearbox produces one of the gear ratios between the primary shaft and the secondary shaft, via the intermediate shaft, the main engine is supplied with power so as to drive the primary shaft and exert a main driving torque on the intermediate shaft, the coupling device is placed in the intermediate coupling position, and the reversible electric machine generates a reinforcement driving torque on the intermediate shaft, with the same sign as the main driving torque;
- a charging mode, in which the transmission gearbox is positioned so as to connect the primary shaft to the intermediate shaft, the main engine is supplied with power so as to drive the primary shaft and exert a main driving torque on the intermediate shaft, the coupling device is placed in the intermediate coupling position, and kinetic energy is converted to electrical energy with the reversible electric machine operating as a generator;
- a transient mode of synchronization of the intermediate shaft during a shift in one of the gear ratios of the transmission gearbox, in which the coupling device is placed in the intermediate coupling position, the main engine is uncoupled from the intermediate shaft, then the reversible electric machine is ordered to bring the intermediate shaft to a speed setpoint allowing engagement of the secondary gear wheel before recoupling the main engine to the intermediate shaft;
- an indirect electric drive mode, in which the coupling device is placed in the intermediate coupling position and the main engine is uncoupled from the intermediate shaft, while the intermediate shaft is kinematically connected to the secondary shaft, then the reversible electric machine is controlled according to a speed setpoint of the vehicle;
- a mode of regenerative braking via the intermediate shaft, in which the coupling device is placed in the intermediate coupling position, the main drive shaft is uncoupled from the intermediate shaft and the reversible electric machine is ordered to operate as a generator;
- a hybrid drive braking mode, in which the coupling device is placed in the intermediate coupling position, one of the gear ratios between the primary shaft and the secondary shaft via the intermediate shaft being engaged, the primary shaft being kinematically connected to the main drive shaft, and kinetic energy is converted to electrical energy with the reversible electric machine operating as a generator and kinetic energy is converted to heat with the main engine providing a resistive torque;
- a power take-off drive mode, in which the coupling device is placed in the intermediate coupling position and the main engine is uncoupled from the intermediate shaft, the intermediate shaft from the secondary shaft, then the reversible electric machine is ordered to drive a power take-off coupled to the intermediate shaft.

BRIEF DESCRIPTION OF THE FIGURES

Further features and advantages of the invention will become apparent from reading the following description, with reference to the appended figures.

For greater clarity, identical or similar elements are identified using identical reference signs in all of the figures.

DETAILED DESCRIPTION OF EMBODIMENTS

Figure 1:
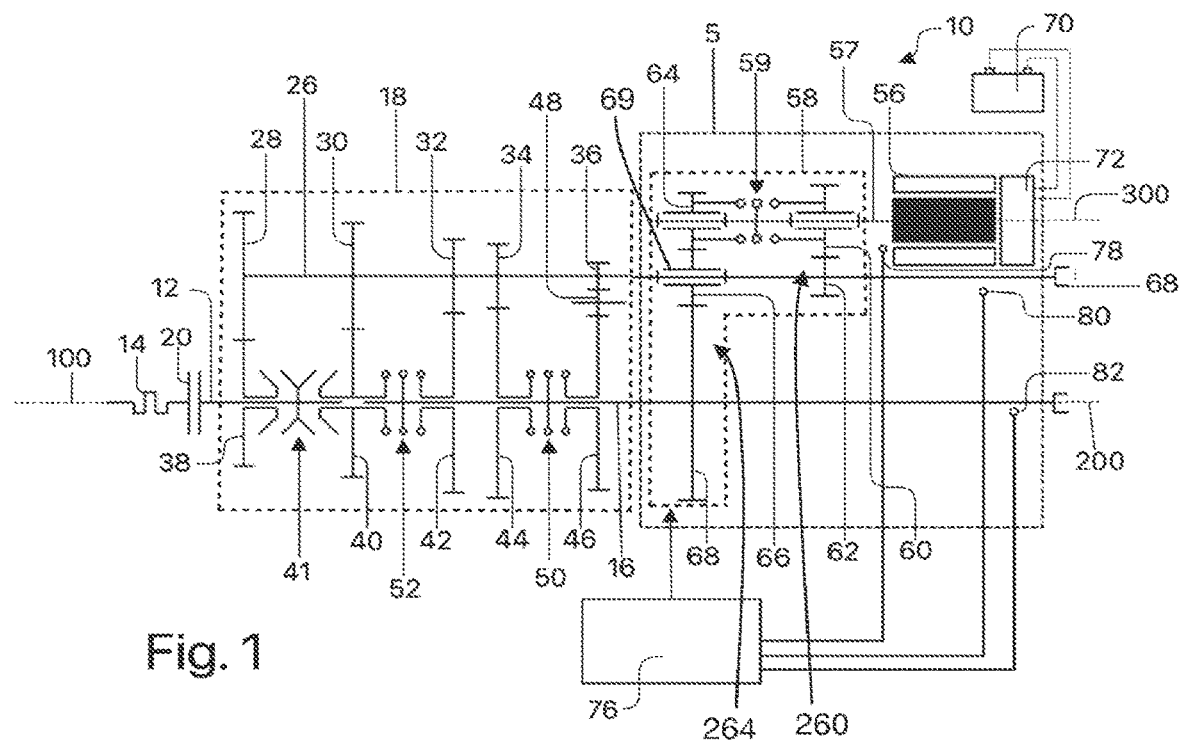
FIG. 1 illustrates a hybrid sub-assembly for driving a vehicle according to a first embodiment.

FIG. 1 illustrates a hybrid sub-assembly 10 for driving a vehicle, having a primary shaft 12 intended to be driven by a main engine 14 of the vehicle, for example an internal combustion engine, a secondary shaft 16 intended to drive a set of one or more drive wheels of the vehicle (not illustrated), and a transmission gearbox 18.

The connection of the main engine 14 to the primary shaft 12 may include a clutch 20 of any appropriate type, for example a slip clutch. The connection of the secondary shaft 16 to the wheels of the vehicle may include one or more drive axles.

The transmission gearbox 18, housed inside a cavity 22 of a transmission casing 24, has an intermediate shaft 26 to which intermediate gear wheels 28, 30, 32, 34, 36 are secured for rotation therewith. Two primary gear wheels 38, 40 that are coaxial with the primary shaft 12 each form a gearset with a corresponding gear wheel 28, 30, respectively, of the intermediate gear wheels. The meshing of the gearsets 38, 28 and 40, 30 between the primary gear wheels 38, 40 and the corresponding intermediate gear wheels 28, 30 is permanent. A three-position dual synchronizer 41 allows one or the other of the primary gear wheels 38, 40 to be coupled to the primary shaft 12, and has a neutral position in which neither of the primary gear wheels 38, 40 is coupled to the primary shaft 12.

Secondary gear wheels 42, 44, 46 that are coaxial with the secondary shaft 16 likewise each form a gearset with a corresponding gear wheel 32, 34, 36, respectively, of the intermediate gear wheels, one of the gearsets being a reversing gearset and having an intermediate gear wheel 48 for producing a reverse gear. The meshing of the gearsets formed by the secondary gear wheels 42, 44, 46 and the corresponding intermediate gear wheels 32, 34, 36 is permanent. A three-position dog coupling 50 without synchronizers, positioned between two of the secondary gear wheels 44, 46, makes it possible to either couple one or the other of the two associated secondary gear wheels 44, 46 to the secondary shaft 16, or, in an intermediate neutral position, keep the associated secondary gear wheels 44, 46 uncoupled from the secondary shaft 16.

In this embodiment, the axis of revolution 100 of the primary shaft 12 is aligned with the axis of revolution 200 of the secondary shaft 16, thereby making it possible to use the end primary gear wheel 40 either as a primary gear wheel, associated with the primary shaft 12 by the synchronizer 41, or as a secondary gear wheel associated with the secondary shaft 16. To this end, a three-position dog coupling 52 without synchronizers, positioned between the end primary gear wheel 40 and the secondary gear wheel 42, makes it possible to couple to the secondary shaft 16 either the end primary gear wheel 40 or the secondary gear wheel 42, and also makes it possible, in an intermediate neutral position, to keep the end primary gear wheel 40 and the secondary gear wheel 42 uncoupled from the secondary shaft 16.

A transmission gearbox 18 with six forward gears and potentially two reverse gears can thus be obtained and can, if necessary, be coupled at the output of the secondary shaft 16 to a planetary gearset (not illustrated) in order to obtain a twelve-speed gearbox.

Notably, the hybrid drive sub-assembly 10 is equipped with an electromotive unit 5 comprising a reversible electric machine 56, the output shaft 57 of which rotates about an axis of revolution 300, and a coupling device 58 which in this example comprises a three-position dog mechanism 59 without a synchronizer and two reduction gearsets with gear wheels 60, 62, 64, 66, 68. In a position of connection to the intermediate shaft 26, also referred to as the intermediate coupling position, the coupling device 58 rotationally couples the output shaft 57 to a speed reducer referred to as the intermediate speed reducer 260, in this case comprising a gear wheel 60 which meshes permanently with a gear wheel 62 secured to the intermediate shaft 26. In a position of connection to the secondary shaft, also referred to as the secondary coupling position, the coupling device 58 rotationally couples the output shaft 57 to a speed reducer referred to as the secondary speed reducer 264, comprising a gear wheel 64 which meshes permanently with a reversing gear wheel 66 which itself meshes permanently with a gear wheel 68 secured to the secondary shaft 16. Notably, it may be provided that the reversing gear wheel 66 be rotationally guided by a guide bearing 69 that is coaxial with the intermediate shaft 26. The intermediate shaft 26 may thus support the guide bearing 69. Lastly, in a neutral position, the coupling device 58 keeps the output shaft 57 uncoupled from the gear wheels 60, 64. Within the coupling device 58, the shift from the intermediate coupling position to the secondary coupling position takes place via the coupling mechanism 59 controlled by a control unit 76.

Where applicable, the intermediate shaft 26 has a power take-off 68 for coupling one or more accessories of the vehicle, for example a winch, a pump or a tool. For example, the power take-off 68 may be a transmission shaft comprising an external connection interface, for example a groove.

The drive shaft 57 shown in FIG. 1 is secured to the rotor of the reversible electric machine 56 and constitutes a drive shaft. Alternatively, the reversible electric machine may incorporate a reducer between the drive shaft and the output shaft 57.

The reversible electric machine 56 is powered by a battery 70 via a two-way current converter 72 which supplies power to the reversible electric machine 56 as a motor and, conversely, rotates the reversible electric machine 56 as a generator to supply power to the battery 70.

The reversible electric machine 56 is preferably a high-voltage machine, supplied with power for example at a nominal voltage of between 300 volts and 800 volts, capable of delivering considerable torque and power, as will be discussed below.

The control unit 76 makes it possible to control the reversible electric machine 56 and its coupling device 58. Sensors 78, 80, 82 are connected to this control unit, to measure the speed of revolution of the output shaft 57, the intermediate shaft 26 and the secondary shaft 16, or speeds of revolution of elements permanently driven in rotation by these shafts. This control unit 76 can be incorporated into a robotic control of the transmission gearbox 18 that controls the opening and closing of the synchronizers 41, the dog mechanisms 50, 52 and, if applicable, the main clutch 20, in response to a torque or speed setpoint.

The electric machine 56 makes it possible to envisage a plurality of operating modes, as will be discussed below.

Figure 2:
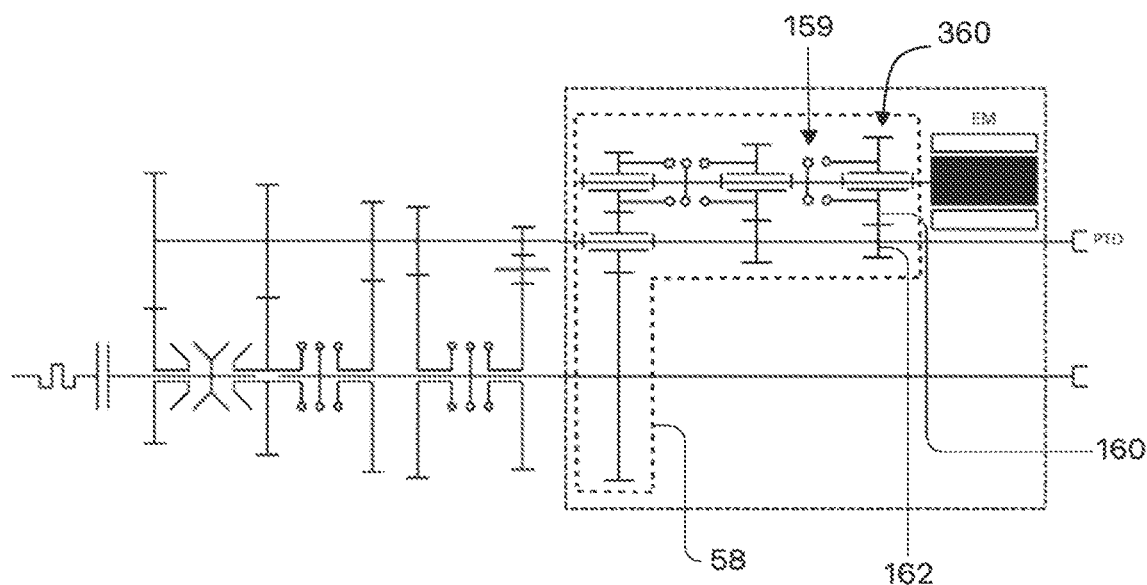
FIG. 2 illustrates a hybrid sub-assembly for driving a vehicle according to a second embodiment.

FIG. 2 shows a hybrid sub-assembly 10 according to a second embodiment of the invention, which differs from the embodiment of FIG. 1 in that the coupling device 58 comprises, in addition to the three-position dog coupling mechanism 59, a two-position dog coupling mechanism 159 which rotationally couples the output shaft 57 to a second intermediate speed reducer 360 comprising a gear wheel 160 which meshes permanently with a gear wheel 162 secured to the intermediate shaft 26. The gear ratio produced by the meshing of the gear wheels 160, 162 is different from the gear ratio from the meshing of the gear wheels 60, 62. In a neutral position, the coupling mechanism 159 keeps the output shaft 57 uncoupled from the gear wheel 160.

A person skilled in the art will understand, without it being necessary to illustrate it in detail, that he could if necessary multiply the gear ratios between the output shaft 57 and the intermediate shaft by adding speed reducers between the coupling mechanisms 59, 159 and the intermediate shaft 26. Similarly, it would be possible to multiply the gear ratios between the output shaft 57 and the secondary shaft 16 by adding coupling mechanisms and speed reducers between the output shaft 57 and the secondary shaft 16.

Figure 3:
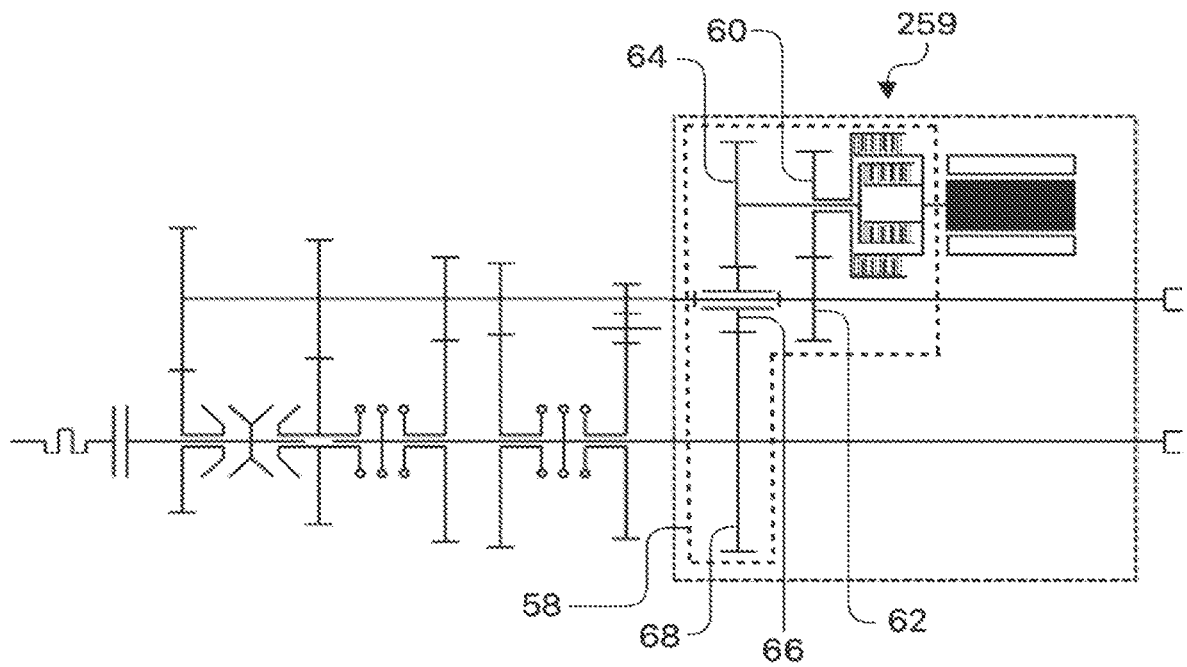
FIG. 3 illustrates a hybrid sub-assembly for driving a vehicle according to a third embodiment.
Figure 4:
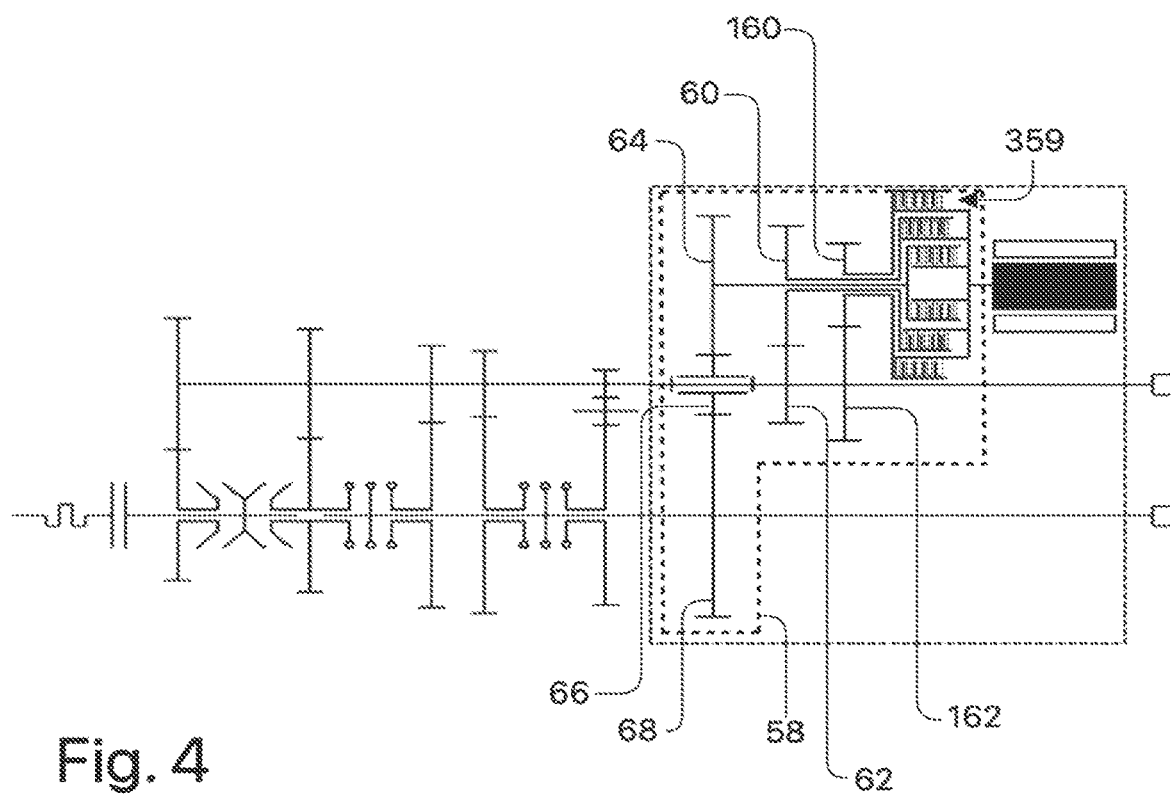
FIG. 4 illustrates a hybrid sub-assembly for driving a vehicle according to a fourth embodiment.
Figure 5:
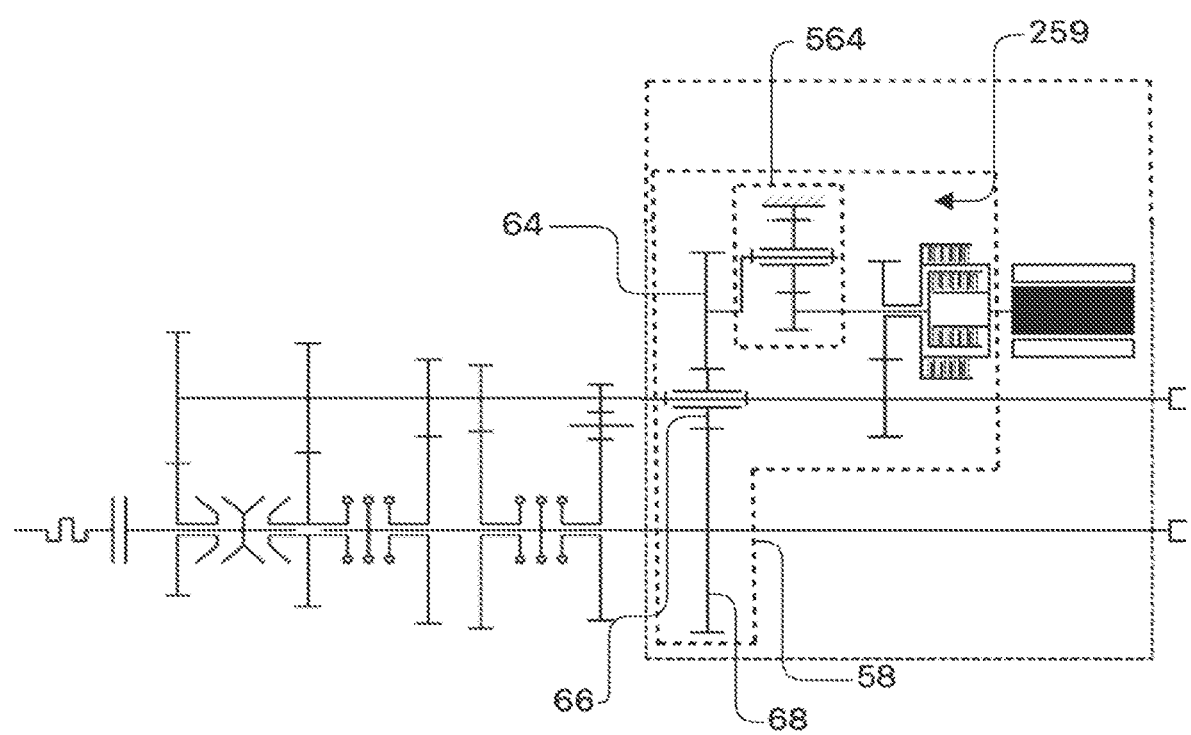
FIG. 5 illustrates a hybrid sub-assembly for driving a vehicle according to a fifth embodiment.

The coupling mechanisms 59, 159 of the coupling device 58 may be of any type, in particular dog mechanisms with or without synchronization or friction mechanisms. FIG. 3 thus shows a third embodiment of the invention, which differs from the embodiment of FIG. 1 in that the coupling device 58 comprises a coupling mechanism in the form of a wet double friction clutch 259. In FIG. 4, the coupling device 58 comprises a coupling mechanism in the form of a wet triple friction clutch 359 with the same gear ratios as the embodiment of FIG. 2. FIG. 5 shows a fifth embodiment of the invention, which differs from the embodiment of FIG. 3 by the addition of a reducer, in this case a planetary gearset 564, between the gear wheel 64 and the secondary shaft 16. Depending on the type of planetary gearset chosen, reverse meshing of the gear wheels 66, 68 may be necessary, or be integrated in the planetary gearset.

In the embodiments of the invention according to FIGS. 2 and 4, the coupling device comprises a plurality of coupling and uncoupling positions, in particular three different coupling positions, allowing transmission of power from the reversible electric machine to the intermediate shaft or the secondary shaft according to different gear ratios. The coupling device comprises in particular a first intermediate coupling position, a second intermediate coupling position also referred to as the additional intermediate coupling position, and a secondary coupling position. In the second intermediate coupling position, the coupling device 58 kinematically connects the reversible electric machine 56 to the intermediate shaft 26 with a second intermediate gear ratio that is different from the first intermediate gear ratio.

The various embodiments described have in common a coupling device 58 that can take up at least one coupling position referred to as intermediate coupling position in which the reversible electric machine 56 is kinematically connected to the intermediate shaft, and at least one secondary coupling position in which the reversible electric machine 56 is kinematically connected to the secondary shaft 16 without going via the intermediate shaft 26. These various couplings can be used to obtain a wide variety of operating modes, as will now be discussed.

First of all, a plurality of operating modes may be implemented while the coupling device 58 connects the output shaft 57 to the intermediate shaft 26.

In a transient mode of synchronization of the intermediate shaft during a gear shift, the coupling device 58 is placed in the intermediate coupling position, the main engine 14 is uncoupled from the intermediate shaft 26, either at the clutch 20 or at the dog mechanism 41, then the reversible electric machine 56 is ordered to bring the intermediate shaft 26 to a speed setpoint allowing engagement of the secondary gear wheel before recoupling the main engine 14 to the intermediate shaft 26. During these transient phases, the reversible electric machine 56 thus makes it possible to adapt the speed of revolution of the intermediate shaft to the synchronization requirements during switching of the dog mechanisms 50, 52 or the synchronizers 41. In these phases, the reversible electric machine may be used either as electric motor to increase the speed of revolution of the intermediate shaft 26 or as a generator to reduce this speed. This adjustment of the speed of the intermediate shaft 26 makes it possible to reduce the engagement or synchronization time, without resorting to a gearbox brake.

In a charging mode, one of the primary gear wheels 38, 40 is coupled to the primary shaft 12, the main engine 14 is supplied with power so as to drive the primary shaft 12 and exert a main driving torque on the intermediate shaft 26, the coupling device 58 is placed in the intermediate coupling position, and kinetic energy is converted to electrical energy with the reversible electric machine operating as a generator. Charging may take place while the intermediate shaft 26 is driving the secondary shaft 16 or without connection to the secondary shaft 16.

In a reinforcement mode, one of the secondary gear wheels 42, 44, 46 is coupled to the secondary shaft 16, one of the primary gear wheels 38, 40 is coupled to the primary shaft, the main engine 14 is supplied with power so as to drive the primary shaft 12 and exert a main driving torque on the intermediate shaft 26, and the coupling device 58 is placed in the intermediate coupling position or one of the intermediate coupling positions if there are a plurality thereof, and the reversible electric machine generates a reinforcement driving torque on the intermediate shaft, with the same sign as the main driving torque. The supply of additional power for vehicle traction is provided with one gear ratio (for the embodiments of FIGS. 1, 3 and 5), two gear ratios (for the embodiments of FIGS. 2 and 4), or even more.

In a mode of pure electric drive via the intermediate shaft 26, the coupling device 58 is placed in the intermediate coupling position and the main engine 14 is uncoupled from the intermediate shaft 26, while one of the secondary gear wheels 42, 44, 46 is coupled to the secondary shaft 16, then the reversible electric machine is controlled according to a speed setpoint of the vehicle. For example, to implement such an electric drive mode in the vehicle, it is advantageous for the reversible electric machine to be able to continuously provide a driving torque of greater than 300 Nm, preferably greater than 350 Nm, over a range of speeds spanning more than 1000 rpm, preferably more than 2000 rpm, between a lower limit below 6000 rpm, preferably below 5000 rpm, and an upper limit above 6000 rpm, preferably above 7000 rpm, preferably above 9000 rpm. With such an operating range, combined with a plurality of gear ratios of between 4 and 8 obtained by meshing the gear wheels 32 and 42, 34 and 44, 60, 62, and where applicable 160, 162, electric operation of the vehicle in urban mode can be envisaged.

In a mode of regenerative braking via the intermediate shaft, the coupling device 58 is placed in the intermediate coupling position, the main engine 14 is uncoupled from the intermediate shaft 26, at the clutch 20 or the synchronizers 41, one of the dog clutches 50, 52 is engaged to connect the intermediate shaft 26 to the secondary shaft 16, and the reversible electric machine 56 is ordered to operate as a generator.

In a hybrid drive braking mode, the coupling device 58 is placed in the intermediate coupling position, the kinematic connection is maintained between the main engine 14, the intermediate shaft 26 and the secondary shaft 16, some of the kinetic energy transmitted by the secondary shaft 16 is converted to electrical energy with the reversible electric machine 56 operating as a generator and some of the kinetic energy transmitted by the secondary shaft 16 is converted to heat with the main engine 14 providing a resistive torque. This operating mode makes it possible to obtain a braking torque greater than that obtained with the main engine 14 alone.

It is also possible to use the reversible electric machine 56 as a motor to drive the power take-off 68 while the transmission gearbox 18 is in the neutral position to break the connection between the intermediate shaft 26 and the primary shaft 12, on the one hand, and between the intermediate shaft 26 and the secondary shaft 16 on the other hand.

Particularly advantageously, other operating modes may be envisaged while the coupling device 58 connects the output shaft 57 to the intermediate shaft 26.

It is thus possible to implement a transient mode in which traction is maintained during a gear shift, in which the coupling device 58 is placed in the secondary coupling position, the main engine 14 is uncoupled from the intermediate shaft 26, and the reversible electric machine 56 is ordered to generate a driving torque on the secondary shaft 16 or to minimize a variation in speed of the secondary shaft when a change in gear ratio of the transmission gearbox 18 is ordered between the main engine 14 and the intermediate shaft 26 and/or between the intermediate shaft 26 and the secondary shaft 16.

It is also possible to contemplate a mode of pure regenerative braking without the intermediate shaft 26, in which the coupling device is placed in the secondary coupling position, the secondary shaft 16 is uncoupled from the intermediate shaft 26 by acting on the dog mechanisms 50, 52, and electrical energy is generated with the reversible electric machine 56 operating as a generator. For optimal implementation of this mode of regenerative braking without the main engine, it is advantageous for the reversible electric machine to be able to provide a resistive torque of greater than 400 Nm, preferably greater than 450 Nm, over a range of speeds spanning more than 3000 rpm, preferably more than 4000 rpm, between a lower limit below 6500 rpm, preferably below 6000 rpm, and an upper limit above 9000 rpm, preferably above 10000 rpm, for at least 30 seconds.

The transient mode in which traction is maintained during a gear shift and the mode of pure regenerative braking without the intermediate shaft 26 are transient operating modes which are not intended to last more than around thirty seconds. For example, with a gear ratio of around 8 between the output shaft 57 and the secondary shaft 16, it is advantageous for the reversible electric machine to be dimensioned so as to provide a resistive torque of greater than 400 Nm, preferably greater than 450 Nm, over a range of speeds spanning more than 3000 rpm, preferably more than 4000 rpm, between a lower limit below 6500 rpm, preferably below 6000 rpm, and an upper limit above 9000 rpm, preferably above 10000 rpm, for 30 seconds.

Lastly, it is possible to implement a mode of direct electric drive without the intermediate shaft 26, in which the coupling device 58 is placed in the secondary coupling position and the intermediate shaft 26 is uncoupled from the secondary shaft 16 at the dog mechanisms 50, 52, the reversible electric machine acting in drive or regenerative mode depending on the acceleration or braking requirements. This operating mode is less flexible than the mode of electric drive with the intermediate shaft since the plurality of gear ratios of the transmission gearbox 18 is not available. However, it may be used in addition to the latter, offering a direct gear ratio between the output shaft 57 and the secondary shaft 16 which is higher than the gear ratios using the transmission gearbox 18. For example, it is possible to have two ratios of around 4 and 6, respectively, with the dog clutches 50, 52 of the transmission gearbox 18 combined with the set of gear wheels 60, 62 of the coupling device 58, and an additional gear ratio of around 8 via the set of gear wheels 64, 66, 68 of the coupling device 58.

Of course, the examples shown in the figures and described above are only provided by way of a non-limiting illustration. Provision is explicitly made for the various illustrated embodiments to be combined in order to propose further embodiments.

According to one alternative that has not been illustrated, the power take-off member 68 is positioned on the output shaft 57 of the reversible electric machine 56.

The invention claimed is:

1. Hybrid sub-assembly for driving a vehicle, having:
at least one primary shaft;
at least one secondary shaft;
a transmission gearbox comprising at least one intermediate shaft different from the primary shaft and the secondary shaft and sets of gear wheels for obtaining a plurality of gear ratios between the primary shaft and the secondary shaft via the intermediate shaft; and
an electromotive unit comprising at least one reversible electric machine, and a coupling device which, in at least one intermediate coupling position, kinematically connects an output shaft of the reversible electric machine to the intermediate shaft, wherein:
the coupling device, in a secondary coupling position, kinematically connects the output shaft of the reversible electric machine to the secondary shaft without going via the intermediate shaft,
the coupling device comprises at least one coupling mechanism permanently kinematically connected to the output shaft of the reversible electric machine, an intermediate speed reducer permanently kinematically connected to the intermediate shaft and a secondary speed reducer permanently kinematically connected to the secondary shaft, and
the secondary speed reducer comprises a reversing gear wheel rotationally guided by a guide bearing that is coaxial with the intermediate shaft.

2. Hybrid sub-assembly according to claim 1, wherein the coupling device, in at least one uncoupling position, kinematically uncouples the output shaft of the reversible electric machine simultaneously from the intermediate shaft and the secondary shaft.

3. Hybrid sub-assembly according to claim 1, having one or more of the following features:
the reversible electric machine is capable of continuously providing a driving torque of greater than 300 Nm over a range of speeds spanning more than 1000 rpm, between a lower limit below 6000 rpm and an upper limit above 6000 rpm;
the reversible electric machine is capable of providing a resistive torque of greater than 400 Nm, over a range of speeds spanning more than 3000 rpm, between a lower limit below 6500 rpm and an upper limit above 9000 rpm, for 30 seconds;
the reversible electric machine is capable of providing a driving torque of greater than 50 Nm, over a range of speeds spanning more than 5500 rpm, between a lower limit below 5000 rpm and an upper limit above 10000 rpm, for 5 seconds in a transient gear change phase.

4. Hybrid sub-assembly according to claim 1, wherein, in the intermediate coupling position, the coupling device kinematically connects the output shaft of the reversible electric machine to the intermediate shaft with an intermediate gear ratio, in the secondary coupling position, the coupling device kinematically connects the reversible electric machine to the secondary shaft with a secondary gear ratio, and in that at least one of the following criteria is met:
the secondary gear ratio is greater than 6;
the intermediate gear ratio is greater than 4, between the intermediate shaft and the output shaft of the reversible electric machine;
the secondary gear ratio is strictly greater than the intermediate gear ratio.

5. Hybrid sub-assembly according to claim 4, wherein, in an additional intermediate coupling position, the coupling device kinematically connects the reversible electric machine to the intermediate shaft with an additional intermediate gear ratio that is different from the intermediate gear ratio.

6. Hybrid sub-assembly according to claim 1, wherein it further comprises a power take-off member that can be driven by at least the reversible electric machine in one of the following manners:
the power take-off member is permanently kinematically connected to the intermediate shaft;
the power take-off member is kinematically connected to the output shaft of the reversible electric machine by the coupling device in the intermediate coupling position.

7. Hybrid sub-assembly according to claim 1, wherein the output shaft of the reversible electric machine has an axis of revolution parallel to an axis of revolution of the intermediate shaft, one or more of the following features being present:
the axis of revolution of the output shaft is coincident with the axis of revolution of the intermediate shaft;
the axis of revolution of the output shaft is separate from the axis of revolution of the intermediate shaft;
the axis of revolution of the output shaft is separate from an axis of revolution of the primary shaft;
the axis of revolution of the output shaft is separate from an axis of revolution of the secondary shaft.

8. Hybrid sub-assembly according to claim 1, wherein the coupling device comprises a planetary gearset arranged kinematically between the output shaft and the secondary shaft.

9. Hybrid sub-assembly according to claim 1, wherein the coupling device comprises one or more of the following coupling mechanisms:
a dog mechanism,
a synchronizer mechanism,
a clutch mechanism,
a double friction clutch,
a triple friction clutch.

10. Hybrid sub-assembly according to claim 1, wherein it comprises a control unit for controlling the reversible electric machine and the coupling device, and sensors capable of generating a signal representative of a speed of revolution of the intermediate shaft or of a member kinematically connected thereto, a signal representative of a speed of revolution of the secondary shaft or of a member kinematically connected thereto, and a signal representative of a speed of revolution of the reversible electric machine or of a member kinematically connected thereto.

11. Hybrid engine unit comprising a main engine, with a main drive shaft, wherein it further comprises a hybrid sub-assembly according to claim 1, the main drive shaft being connected to the primary shaft directly or via a clutch or a torque converter.

12. Hybrid sub-assembly of claim 10, comprising a hybrid engine unit comprising a main engine, with a main drive shaft, the main drive shaft being connected to the primary shaft directly or via a clutch or a torque converter, wherein the control unit for controlling the coupling device is operational to manage one or more of the following operating modes:
  a transient mode in which traction is maintained during a gear shift, in which the coupling device is placed in the secondary coupling position, the main engine is uncoupled from the intermediate shaft, and the reversible electric machine is ordered to generate a driving torque on the secondary shaft or to minimize a variation in speed of the secondary shaft when a change in gear ratio of the transmission gearbox is ordered;
  a mode of pure regenerative deceleration without the intermediate shaft, in which the coupling device is placed in the secondary coupling position, the secondary shaft is uncoupled from the intermediate shaft and electrical energy is generated with the reversible electric machine operating as a generator;
  a mode of direct electric drive without the intermediate shaft, in which the coupling device is placed in the secondary coupling position, the intermediate shaft is uncoupled from the secondary shaft and the reversible electric machine provides the drive.

13. Hybrid engine unit according to claim 12, wherein the control unit is operational to manage one or more of the following operating modes:
  a reinforcement mode, in which the transmission gearbox produces one of the gear ratios between the primary shaft and the secondary shaft, via the intermediate shaft, the main engine is supplied with power so as to drive the primary shaft and exert a main driving torque on the intermediate shaft, the coupling device is placed in the intermediate coupling position, and the reversible electric machine generates a reinforcement driving torque on the intermediate shaft, with the same sign as the main driving torque;
  a charging mode, in which the transmission gearbox is positioned so as to connect the primary shaft to the intermediate shaft, the main engine is supplied with power so as to drive the primary shaft and exert a main driving torque on the intermediate shaft, the coupling device is placed in the intermediate coupling position, and kinetic energy is converted to electrical energy with the reversible electric machine operating as a generator;
  a transient mode of synchronization of the intermediate shaft during a shift in one of the gear ratios of the transmission gearbox, in which the coupling device is placed in the intermediate coupling position, the main engine is uncoupled from the intermediate shaft, then the reversible electric machine is ordered to bring the intermediate shaft to a speed setpoint allowing engagement of the secondary gear wheel before recoupling the main engine to the intermediate shaft;
  an indirect electric drive mode, in which the coupling device is placed in the intermediate coupling position and the main engine is uncoupled from the intermediate shaft, while the intermediate shaft is kinematically connected to the secondary shaft, then the reversible electric machine is controlled according to a speed setpoint of the vehicle;
  a mode of regenerative braking via the intermediate shaft, in which the coupling device is placed in the intermediate coupling position, the main drive shaft is uncoupled from the intermediate shaft and the reversible electric machine is ordered to operate as a generator;
  a hybrid drive braking mode, in which the coupling device is placed in the intermediate coupling position, one of the gear ratios between the primary shaft and the secondary shaft via the intermediate shaft being engaged, the primary shaft being kinematically connected to the main drive shaft, and kinetic energy is converted to electrical energy with the reversible electric machine operating as a generator and kinetic energy is converted to heat with the main engine providing a resistive torque;
  a power take-off drive mode, in which the coupling device is placed in the intermediate coupling position and the main engine is uncoupled from the intermediate shaft, the intermediate shaft from the secondary shaft, then the reversible electric machine is ordered to drive a power take-off coupled to the intermediate shaft.

14. Hybrid drive method for a vehicle comprising a hybrid engine unit according to claim 11, wherein, with a control unit for controlling the coupling device, one or more of the following operating modes are managed:
  a transient mode in which traction is maintained during a gear shift, in which the coupling device is placed in the secondary coupling position, the main engine is uncoupled from the intermediate shaft, and the reversible electric machine is ordered to generate a driving torque on the secondary shaft or to minimize a variation in speed of the secondary shaft when a change in gear ratio of the transmission gearbox is ordered;
  a mode of pure regenerative deceleration without the intermediate shaft, in which the coupling device is placed in the secondary coupling position, the secondary shaft is uncoupled from the intermediate shaft and electrical energy is generated with the reversible electric machine operating as a generator;
  a mode of direct electric drive without the intermediate shaft, in which the coupling device is placed in the secondary coupling position, the intermediate shaft is uncoupled from the secondary shaft and the reversible electric machine provides the drive.

15. Hybrid drive method according to claim 14, wherein, with the control unit, one or more of the following operating modes are managed:
  a reinforcement mode, in which the transmission gearbox produces one of the gear ratios between the primary shaft and the secondary shaft, via the intermediate shaft, the main engine is supplied with power so as to drive the primary shaft and exert a main driving torque on the intermediate shaft, the coupling device is placed in the intermediate coupling position, and the reversible electric machine generates a reinforcement driving torque on the intermediate shaft, with the same sign as the main driving torque;

a charging mode, in which the transmission gearbox is positioned so as to connect the primary shaft to the intermediate shaft, the main engine is supplied with power so as to drive the primary shaft and exert a main driving torque on the intermediate shaft, the coupling device is placed in the intermediate coupling position, and kinetic energy is converted to electrical energy with the reversible electric machine operating as a generator;

a transient mode of synchronization of the intermediate shaft during a shift in one of the gear ratios of the transmission gearbox, in which the coupling device is placed in the intermediate coupling position, the main engine is uncoupled from the intermediate shaft, then the reversible electric machine is ordered to bring the intermediate shaft to a speed setpoint allowing engagement of the secondary gear wheel before recoupling the main engine to the intermediate shaft;

an indirect electric drive mode, in which the coupling device is placed in the intermediate coupling position and the main engine is uncoupled from the intermediate shaft, while the intermediate shaft is kinematically connected to the secondary shaft, then the reversible electric machine is controlled according to a speed setpoint of the vehicle;

a mode of regenerative braking via the intermediate shaft, in which the coupling device is placed in the intermediate coupling position, the main drive shaft is uncoupled from the intermediate shaft and the reversible electric machine is ordered to operate as a generator;

a hybrid drive braking mode, in which the coupling device is placed in the intermediate coupling position, one of the gear ratios between the primary shaft and the secondary shaft via the intermediate shaft being engaged, the primary shaft being kinematically connected to the main drive shaft, and kinetic energy is converted to electrical energy with the reversible electric machine operating as a generator and kinetic energy is converted to heat with the main engine providing a resistive torque;

a power take-off drive mode, in which the coupling device is placed in the intermediate coupling position and the main engine is uncoupled from the intermediate shaft, the intermediate shaft from the secondary shaft, then the reversible electric machine is ordered to drive a power take-off coupled to the intermediate shaft.

16. Hybrid sub-assembly according to claim 1, wherein the coupling device comprises at least one coupling mechanism permanently kinematically connected to the output shaft of the reversible electric machine, an intermediate speed reducer permanently kinematically connected to the intermediate shaft and a secondary speed reducer permanently kinematically connected to the secondary shaft.

17. Hybrid sub-assembly according to claim 1, having one or more of the following features:

the reversible electric machine is capable of continuously providing a driving torque of greater than 300 Nm over a range of speeds spanning more than 1000 rpm, between a lower limit below 6000 rpm and an upper limit above 6000 rpm;

the reversible electric machine is capable of providing a resistive torque of greater than 400 Nm, over a range of speeds spanning more than 3000 rpm, between a lower limit below 6500 rpm and an upper limit above 9000 rpm, for 30 seconds;

the reversible electric machine is capable of providing a driving torque of greater than 50 Nm, over a range of speeds spanning more than 5500 rpm, between a lower limit below 5000 rpm and an upper limit above 10000 rpm, for 5 seconds in a transient gear change phase.

18. Hybrid sub-assembly according to claim 1, wherein, in the intermediate coupling position, the coupling device kinematically connects the output shaft of the reversible electric machine to the intermediate shaft with an intermediate gear ratio, in the secondary coupling position, the coupling device kinematically connects the reversible electric machine to the secondary shaft with a secondary gear ratio, and in that at least one of the following criteria is met:

the secondary gear ratio is greater than 6;

the intermediate gear ratio is greater than 4, between the intermediate shaft and the output shaft of the reversible electric machine;

the secondary gear ratio is strictly greater than the intermediate gear ratio.

19. Hybrid sub-assembly for driving a vehicle, having:

at least one primary shaft;

at least one secondary shaft;

a transmission gearbox comprising at least one intermediate shaft different from the primary shaft and the secondary shaft and sets of gear wheels for obtaining a plurality of gear ratios between the primary shaft and the secondary shaft via the intermediate shaft; and an electromotive unit comprising at least one reversible electric machine, and a coupling device which, in at least one intermediate coupling position, kinematically connects an output shaft of the reversible electric machine to the intermediate shaft, wherein:

the coupling device, in a secondary coupling position, kinematically connects the output shaft of the reversible electric machine to the secondary shaft without going via the intermediate shaft, in the intermediate coupling position, the coupling device kinematically connects the output shaft of the reversible electric machine to the intermediate shaft with an intermediate gear ratio, while in the secondary coupling position, the coupling device kinematically connects the reversible electric machine to the secondary shaft with a secondary gear ratio, and in an additional secondary coupling position, the coupling device kinematically connects the reversible electric machine to the secondary shaft with an additional secondary gear ratio that is different from the secondary gear ratio.

\* \* \* \* \*